US008959534B2

(12) United States Patent
Scaffidi, Jr. et al.

(10) Patent No.: US 8,959,534 B2
(45) Date of Patent: Feb. 17, 2015

(54) ENABLING LEGACY APPLICATIONS TO ACHIEVE END-TO-END COMMUNICATION WITH CORRESPONDING LEGACY DEVICE SERVICES

(75) Inventors: Salvatore Gregory Scaffidi, Jr., Leander, TX (US); Gobinath Sermugaraj, Chennai (IN); Saravanan Jaganathan, Coimbatore (IN)

(73) Assignee: MCCI Corporation, Ithaca, NY (US)

( * ) Notice: Subject to any disclaimer, the term of this patent is extended or adjusted under 35 U.S.C. 154(b) by 123 days.

(21) Appl. No.: 13/618,689

(22) Filed: Sep. 14, 2012

(65) Prior Publication Data
US 2013/0326541 A1 Dec. 5, 2013

Related U.S. Application Data

(60) Provisional application No. 61/652,633, filed on May 29, 2012.

(51) Int. Cl.
*G06F 13/00* (2006.01)
(52) U.S. Cl.
USPC ....................................................... 719/321
(58) Field of Classification Search
USPC ....................................................... 719/318
See application file for complete search history.

(56) References Cited

U.S. PATENT DOCUMENTS

| 8,200,853 | B2 | 6/2012 | Aull et al. | |
|---|---|---|---|---|
| 2005/0245272 | A1* | 11/2005 | Spaur et al. | 455/456.3 |
| 2009/0265720 | A1* | 10/2009 | Nagampalli et al. | 719/321 |
| 2010/0064063 | A1 | 3/2010 | Deforche et al. | |

FOREIGN PATENT DOCUMENTS

WO WO 2007/024544 3/2007

OTHER PUBLICATIONS

PCT Notification of Transmittal of the International Search Report and the Written Opinion of the International Searching Authority, or the Declaration, International Searching Authority, International Application No. PCT/US2013/043013, mailed Aug. 6, 2013, 8 pages.
Universal Serial Bus 3.0 Specification, Revision 1.0, Nov. 12, 2008, 482 pages.
Universal Serial Bus Communications Class Subclass Specification for Mobile Broadband Interface Model, Revision 1.0, Nov. 14, 2011, 225 pages.

(Continued)

*Primary Examiner* — Brian W Wathen
*Assistant Examiner* — Timothy A Mudrick
(74) *Attorney, Agent, or Firm* — Cesari and McKenna, LLP

(57) ABSTRACT

Embodiments described herein enable legacy applications to achieve end-to-end communication with their corresponding device services in a host computer. To that end, one or more legacy protocol stacks are configured to interface with a component that implements and manages a Device Service Streams (DSS) application programming interface (API) which communicates through a Mobile Broadband class driver to a Device Service residing in a Mobile Broadband Interface Model (MBIM) compliant device attached to the computer. In one or more embodiments, end-to-end communication is illustratively achieved through the use of a plurality of components: a Device Services Composite Driver (DSCD), a Device Services Legacy Software Protocol Driver (DSLSPD), and a Device Services Legacy Software Protocol Controller (DSLSPC).

20 Claims, 3 Drawing Sheets

(56) References Cited

OTHER PUBLICATIONS

Support for the Wireless Mobile Communication Device Class, Microsoft Inc, Oct. 10, 2012. Downloaded from http://msdn.microsoft.com/en-us/library/windows/hardware/ff538833(v=vs.85).aspx on Nov. 13, 2012, 3 pages.

Universal Serial Bus 2.0 Specification, Apr. 27, 2000, 590 pages.

\* cited by examiner

ENABLING LEGACY APPLICATIONS TO ACHIEVE END-TO-END COMMUNICATION WITH CORRESPONDING LEGACY DEVICE SERVICES

The present utility patent application claims priority from a provisional patent application of common title, inventorship, and ownership. The provisional patent application, which is assigned Ser. No. 61/652,633 and filed on May 29, 2012, is hereby incorporated herein by reference.

BACKGROUND

1. Technical Field

The present disclosure relates generally to communication between legacy software stacks and corresponding device software when direct communication is not possible, for example when an operating system of a computer no longer provides native support. More specifically, the present disclosure relates to end-to-end communication between legacy software protocol stacks and corresponding device software through the use of a Device Service Streams (DSS) feature of a Mobile Broadband Interface Model (MBIM).

2. Background Information

Hardware and software technology advancements, as well as increases in communication data transfer rates, are often accompanied by a corresponding desire to decrease complexity. Whereas a device that previously supported multiple functions required multiple interfaces and associated requisite hardware and software, many modern device implementations attempt to achieve similar functionality through multiplexing control and data traffic for those functions over a single interface. This allows device manufacturers to reduce hardware cost and to theoretically reduce software requirements because minimizing the number of interfaces translates into fewer drivers that need to be installed and loaded to operate the interfaces.

However, if a software stack controlling this single interface (which carries multiplexed control and data traffic for multiple device functions) does not support communication with existing, i.e., legacy, software stacks, then a promise of an overall reduction in software requirements and thereby cost may be difficult, if not impossible, to achieve. As used herein, legacy software (protocol stack) denotes existing software that was previously used to communicate with "like" (similar) services on a device. Device manufacturers may be justifiably reluctant to fund a massive rewrite of legacy software in order to simply maintain the same level of functionality as was achievable in the past. This situation results in the additional backlash effect of a potential negative impact on the adoption of such technology.

SUMMARY

Embodiments described herein enable legacy applications to achieve end-to-end communication with their corresponding device services in a host computer. To that end, one or more legacy protocol stacks is configured to interface with a component that implements and manages a Device Service Streams (DSS) application programming interface (API) to communicate through a Mobile Broadband (MB) class driver to a Device Service residing in a Mobile Broadband Interface Model (MBIM) compliant device attached to the computer. In one or more embodiments, end-to-end communication is illustratively achieved through the use of a system infrastructure that includes a plurality of components: a Device Services Composite Driver (DSCD), a Device Services Legacy Software Protocol Driver (DSLSPD), and a Device Services Legacy Software Protocol Controller (DSLSPC).

In an embodiment, the DSCD is a component that is loaded by an operating system of the host computer when the system is first started or restarted. The DSCD registers a unique device interface globally unique identifier (GUID) with the system. The DSLSPC is another component that is loaded by the operating system when the system is first started or restarted. The DSLSPC registers with the system for one or more event notifications indicating that the MBIM compliant device has been attached to the system and that the DSCD has successfully registered its unique device interface GUID. The DSLSPC utilizes the DSS API to enumerate any Device Service Streams supported by the device that can be controlled by one or more legacy protocol stacks embodied as, e.g., one or more DSLSPDs. The DSLSPC has a capability to cause multiple instances of the DSLSPD to load corresponding to the number of similar Device Service Streams supported by the MBIM device. The DSLSPD is a component that contains the functionality of a legacy protocol stack and which has the ability to communicate with the DSLSPC through the DSCD.

Operationally, the DSLSPC is loaded by the operating system during a system boot process and registers to receive one or more event notifications when the MBIM device is detected. The DSCD, which is illustratively a root-enumerated bus driver also loaded by the system during the system boot process, registers its unique device interface GUID in order to bind to the DSLSPC and establish a private API for subsequent communication. The DSCD receives messages from the DSLSPC through the private API when the MBIM device (with supporting device services) is detected by the DSLSPC. When the MBIM compliant device is attached to the operating system, the MB class driver is loaded by the operating system to communicate with the device and a notification is received by the DSLSPC.

In an embodiment, the DSLSPC uses the DSS API to enumerate the device services supported by the MBIM device. If any device services of interest are supported by the device, the DSLSPC notifies the DSCD through the previously-established private API. Upon receiving this notification, the DSCD prepares for further messages from the DSLSPC indicating the detection of specific device services. For each different device service enumerated on the device, the DSLSPC issues a message to the DSCD through the private API identifying the specific device service, which causes the DSCD to create a child driver instance of the appropriate DSLSPD that is then loaded by the system. Once loaded, the DSLSPD instance registers a unique device interface GUID for the desired specific legacy protocol stack, thus establishing an interface available for legacy applications to utilize for end-to-end communication.

When the MBIM device is detached from the system, a notification is received by the DSLSPC which, in turn, informs the DSCD through the private API. The DSCD then causes one or more departure notifications to be received by each loaded DSLSPD instance. Each DSLSPD instance responds to this notification by deregistering the unique device interface GUID for its legacy protocol stack previously registered and begins the process of unloading. The DSCD reports a change in status of its children and participates in their subsequent unloading, thus tearing down the system infrastructure that enabled legacy applications to achieve end-to-end communication with their corresponding device services.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

DETAILED DESCRIPTION OF ILLUSTRATIVE EMBODIMENTS

Figure 1:
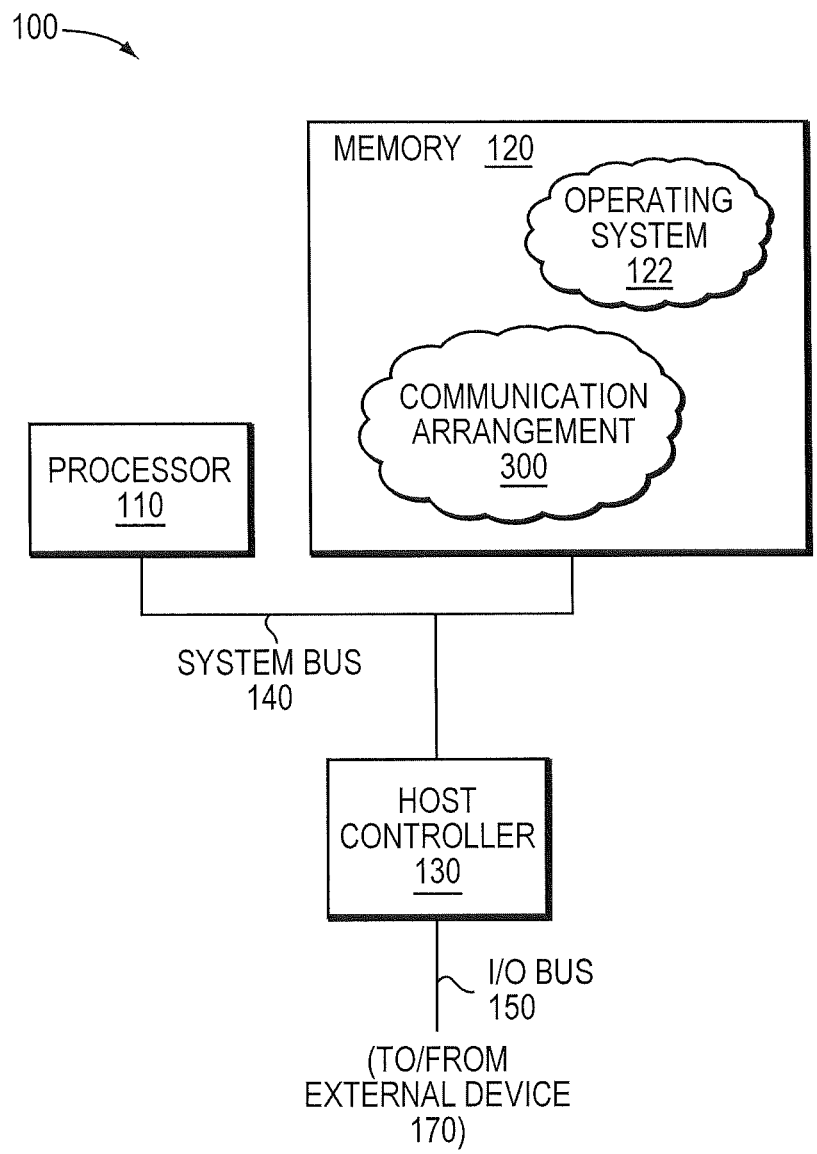
FIG. 1 is a schematic block diagram of a computer.

FIG. 1 is a schematic block diagram of a computer that may be advantageously used with one or more embodiments described herein as, e.g., a host computer. Illustratively, the computer may be embodied as a Universal Serial Bus (USB) host computer system 100 that includes a processor 110, memory 120 and a host controller 130, e.g., a USB host controller, interconnected by a system bus 140. The host controller 130 contains the mechanical, electrical and signaling circuitry needed to connect the computer 100 to external devices 170, e.g., USB external devices, coupled to an input/output (I/O) bus 150, e.g., a USB bus. To that end, the host controller 130 provides a hardware interface for the external devices 170, which may include a keyboard, mouse, mass storage, digital camera, serial port device, as well as many other types of devices.

The memory 120 may include a plurality of locations that are addressable by the processor 110 and/or host controller 130 for storing software programs and data structures associated with the embodiments described herein. The processor 110 may include logic adapted to execute the software programs and manipulate (i.e., control) the data structures. An exemplary processor 110 may include single or multi-core Central Processing Unit (CPU), Graphics Processing Unit (GPU), Field Programmable Gate Array (FPGA) and/or Application Specific Integrated Circuit (ASIC).

An operating system 122, portions of which is typically resident in memory 120 and executed by the processor 110, functionally organizes the computer system 100 by, inter alia, invoking operations in support of software programs, including processes and/or applications, executing on the system. The software processes/applications may include various processes and/or applications associated with a communication arrangement 300 and, as such, contain computer executable instructions executed by processor 110 of computer system 100 to perform functions described herein.

The operating system 122 is illustratively organized as a series of software layers including protocol stacks organized as, e.g., driver stacks. A suitable operating system 122 may include the Linux® operating system, the MAC OS® series of operating systems from Apple Inc. of Cupertino, Calif., and the UNIX® series of operating systems, among others. However, the disclosure herein is directed to the Microsoft Corporation Operating Systems and, in particular, the Windows® series of operating systems from Microsoft Corp. of Redmond, Wash. These systems are well known to those who develop software that interfaces with a kernel of the operating system. Except for certain of the components or modules provided by the communication arrangement 300, the various software modules referred to herein may have been published by Microsoft Corporation.

It will be apparent to those skilled in the art that other types of processors and memory, including various tangible, non-transitory computer-readable media, may be used to store and execute program instructions pertaining to the system described herein. Also, while the embodiments herein are described in terms of software processes, components and/or applications stored in memory, alternative embodiments also include those processes, components and/or applications being embodied as modules consisting of hardware, software, firmware, or combinations thereof.

In one or more embodiments, the software processes, components and/or modules, including the drivers and controller, described herein may be implemented as separately-scheduled processes within the computer system 100; however, in an alternate embodiment, the modules may be implemented as pieces of code within a single process. Communication between the modules of the computer system 100 may thus illustratively be effected through the use of message passing, shared memory or remote procedure calls (RPCs) between the modules. A suitable message passing, shared memory and/or RPC mechanism provided by the operating system 122 to transfer information between modules (processes) is the Inter Process Communication (IPC) mechanism.

Figure 2:
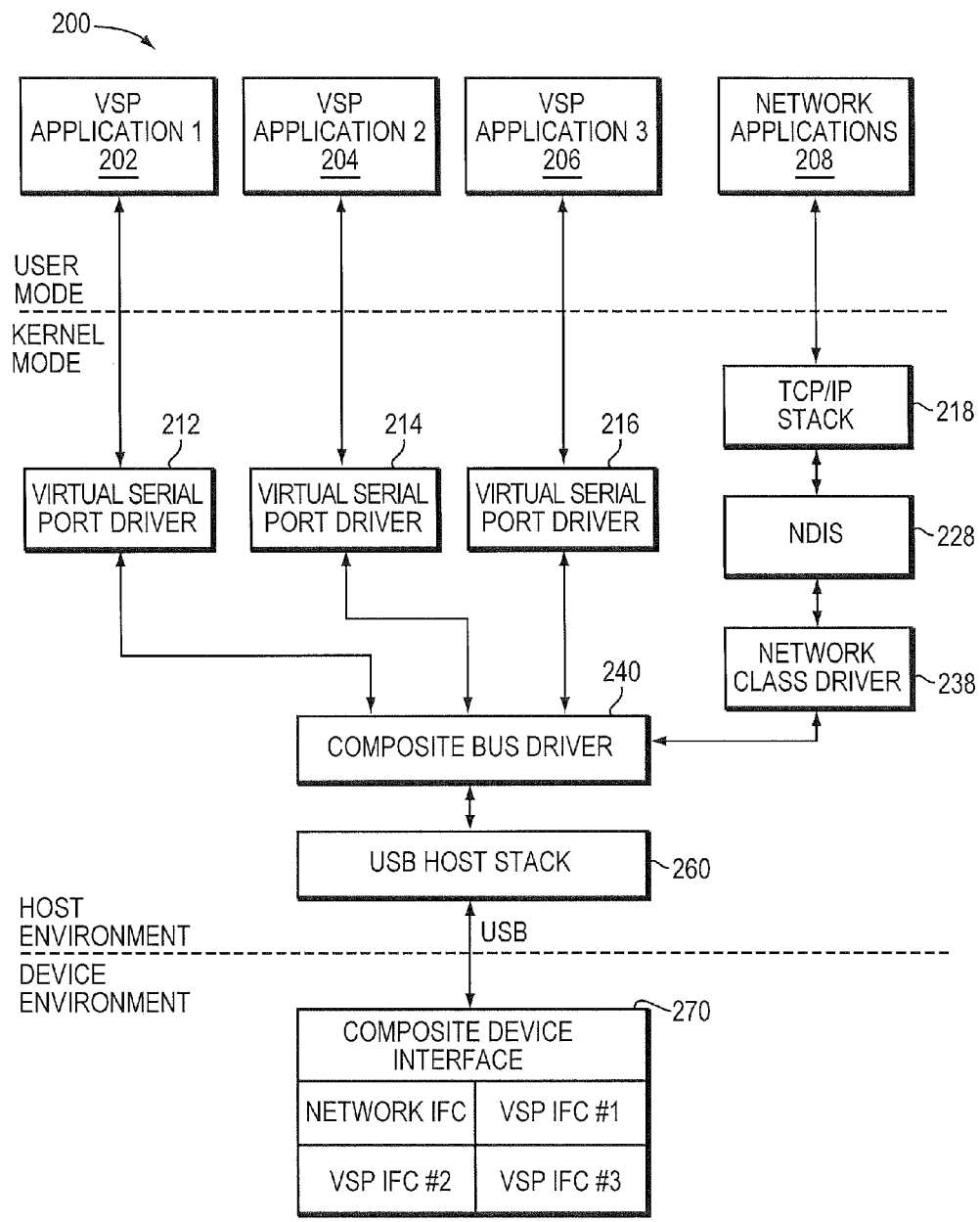
FIG. 2 is a block diagram of a conventional arrangement for communication between legacy applications and a multifunction composite device connected to the computer.

FIG. 2 is a block diagram of a conventional arrangement 200 for communication between legacy applications and a multifunction composite device connected to the computer 100. Specifically, FIG. 2 depicts a conventional software arrangement for communication between legacy virtual serial port (VSP) applications #1-3, such as a global positioning system (GPS) map application, a synchronization application, and a diagnostic port application utility, and a USB (external) multifunction composite device 270 connected to the I/O bus 150 via a port (e.g., a USB port) of the computer 100. More specifically, FIG. 2 illustrates the components involved in controlling a conventional composite device 270 exposing a composite device interface, a network interface (IFC) and three virtual serial port (VSP) interfaces.

The VSP Application #1 202 communicates with a GPS receiver function of the device 270 to provide various map functions to the computer 100. The VSP Application #2 204 is used to synchronize specific data in the computer with information maintained in the device 270. The VSP Application #3 206 communicates with a diagnostic VSP function of the device 270. Network applications 208 communicate with a network interface function (IFC) of the device 270 to provide access to an external radio network.

The network applications 208 are interfaced with a kernel of the operating system 122 through a Transmission Control Protocol/Internet Protocol (TCP/IP) stack 218 and a network driver interface specification (NDIS) module 228. The NDIS 228, in turn, communicates with a network class driver 238. The VSP applications 202-206 are interfaced with the operating system kernel by a Win32 serial application program interface (API). The Win32 API, in turn, communicates with an instance of a VSP device driver 212-216, which also registers as a virtual communication (com) port for applications to access. The communication path is completed by a composite (USB) bus driver, 240 which includes driver stacks for incoming and outgoing data and control information for each child function driver, and which interfaces to a system USB driver interface (USBDI) of a USB host stack 260.

When a USB device is connected to the system or when the system is first turned on or restarted, a USB host controller driver of host stack 260 checks the I/O bus 150 for external (USB) devices. The host controller interrogates the devices that it finds and identifies them to the operating system. The operating system then loads the composite bus driver 240 for the device 270 which, in turn, causes the relevant child function drivers (e.g. the network class function driver 238 and VSP driver instances 212-216) to be loaded into memory 120.

The applications 202-208 can then communicate with the respective peripheral functions on the device 170.

Removal of the device 270 during computer operation is detected by the USB host controller driver, which informs the operating system 122 of the removal. The operating system 122 then signals the device function and composite drivers to release their resources, thereby unloading the drivers.

As noted, the present disclosure is directed to end-to-end communication between legacy software protocol stacks and corresponding device software through the use of the Device Service Streams (DSS) feature of the Mobile Broadband Interface Model (MBIM). Broadly stated, MBIM is a well-known networking protocol specification, defined by the Universal Serial Bus Implementers Forum (USBIF), that provides a data and control transport mechanism through the use of, inter alia, command identifiers (CIDs). MBIM also provides Device Services (Streams) that enables transport of various types of protocol traffic, e.g., over a single interface which carries multiplexed data and control traffic for multiple device functions. It should be noted that the description of virtual serial ports (VSP) as the legacy software (protocol stacks) of the present disclosure is merely exemplary and, as such, the legacy software (protocol stacks) could embody any existing software (protocol stack), such as mass storage, networking, etc.

Embodiments described herein enable legacy applications to achieve end-to-end communication with their corresponding device services in a host computer. To that end, one or more legacy protocol stacks may be configured to interface with a component that implements and manages a DSS API to communicate through a Mobile Broadband (MB) class driver to a Device Service residing in a MBIM compliant device attached to the computer. In one or more embodiments, end-to-end communication is illustratively achieved through the use of a system infrastructure that includes a plurality of components: a Device Services Composite Driver (DSCD), a Device Services Legacy Software Protocol Driver (DSLSPD), and a Device Services Legacy Software Protocol Controller (DSLSPC).

Figure 3:
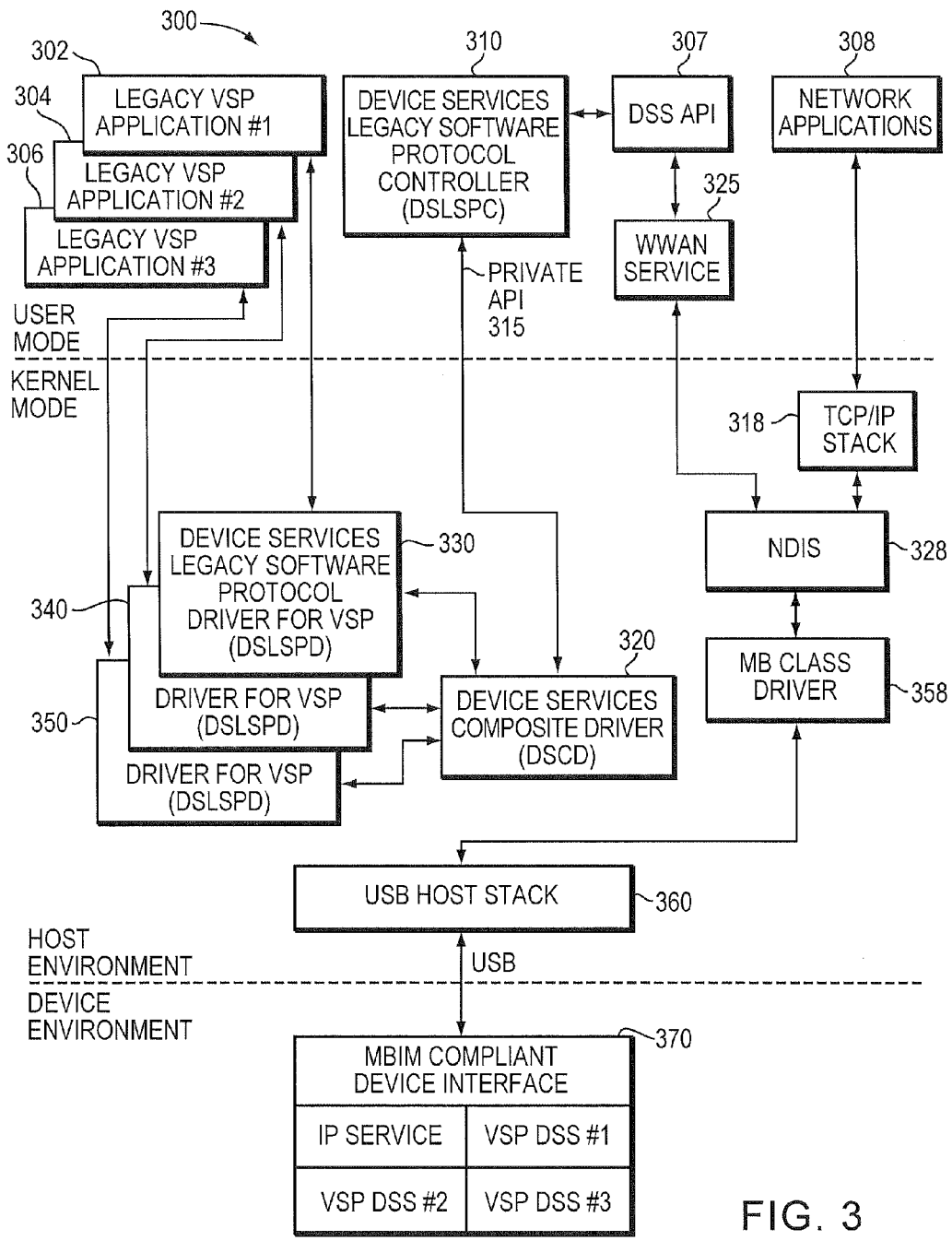
FIG. 3 is a block diagram of a communication arrangement for communication between legacy applications and a MBIM compliant device connected to the computer.

FIG. 3 is a block diagram of the communication arrangement 300 for communication between legacy applications 302-306 and a MBIM compliant device 370 connected to the computer 100. Specifically, FIG. 3 depicts the communication arrangement 300 for communication between legacy virtual serial port (VSP) applications #1-3, such as a GPS map application, a synchronization application, and a diagnostic port application utility, and a USB MBIM compliant device 370, e.g., containing GPS, Sync, and Diagnostic device services, connected to the I/O bus 150 of the computer 100. More specifically, FIG. 3 illustrates the components involved in controlling the MBIM compliant device 370 exposing a single MBIM interface with three VSP device services.

In one or more embodiments, the Legacy VSP Application #1 302 communicates with a GPS receiver device service in the device 370 to illustratively provide various map functions to the computer 100. The Legacy VSP Application #2 304 is used to synchronize specific data in the computer with information maintained by a Sync device service. The Legacy VSP Application #3 306 communicates with a diagnostic device service in the device 370. Network applications 308 communicate with a MBIM interface function of the device 370 to provide access to an external radio network. The network applications 308, an example of which is a browser, are interfaced with the operating system kernel through a TCP/IP stack 318 and NDIS 328. NDIS, in turn, communicates with a MB class driver 358 which, illustratively, is a Microsoft MB class driver. The legacy VSP applications 302-306 are illustratively interfaced with the operating system kernel by a Win32 API. The Win32 API, in turn, communicates with an instance of VSP DSLSPD 330-350, which also registers as a (virtual) com port for legacy applications to access, e.g., when communicating with a corresponding device service on the device 370.

In an embodiment, the DSCD 320 is a component that is loaded by the operating system 122 of the host computer 100 when the system is first started or restarted. The DSCD 320 registers a unique device interface globally unique identifier (GUID) with the operating system. The DSLSPC 310 is another component that is loaded by the operating system when the system is first started or restarted. The DSLSPC 310 registers with the system for one or more event notifications indicating that the MBIM compliant device 370 has been attached to the system and that the DSCD 320 has successfully registered its unique device interface GUID. The DSLSPC 310 utilizes the DSS API 307 to enumerate any Device Service Streams supported by the device 370 that can be controlled by one or more legacy protocol stacks embodied as, e.g., one or more DSLSPDs 330-350. The DSLSPC 310 has a capability to cause multiple instances of the DSLSPD 330-350 to load corresponding to the number of similar Device Service Streams supported by the MBIM device 370. The DSLSPD is a component that contains the functionality of a legacy protocol stack and which has the ability to communicate with the DSLSPC 310 through the DSCD 320.

Specifically, the DSLSPD instances 330-350 communicate with DSLSPC 310 through DSCD 320. The DSLSPC 310 handles conveying data and translating control (plane) information to appropriate MBIM DSS CIDs for transport through the MB class driver 358 (e.g., via DSS API 307) to the individual device services on the device 370. The MB class driver 358 communicates with the MBIM compliant device 370 through a composite USB bus driver or USB generic parent driver, e.g., of USB host stack 360, depending on whether the MBIM device is also a composite device. The USB bus driver or generic parent driver illustratively includes driver stacks for incoming and outgoing data and control information for each child function driver, and interfaces to a system USB driver interface (USBDI) of host stack 360.

According to one or embodiments, during a system boot process when, e.g., the system is first turned on or restarted, the DSLSPC 310 is loaded by the operating system 122 and utilizes one or more user mode DSS APIs to register for one or more event notifications when the MBIM device 370 is detected as having arrived or departed. The DSCD 320 is loaded by the operating system 122 as a root-enumerated bus driver (i.e., a driver that is loaded at power-on/during system boot process) and registers a specific unique device interface GUID to bind with and inform the DSLSPC 310 of its presence, and to establish a private API channel (private API 315) for subsequent communication. As used herein, the private API 315 is illustratively embodied as an interface that provides an exchange of function pointers and/or private I/O control codes (IOCTLs) between, e.g., the DSLSPC 310 and DSCD 320.

When a USB device, such as MBIM compliant device 370, is attached to the system or when the system is first turned on or restarted, USB host controller driver of host stack 360 illustratively checks the I/O bus 150 for external (USB) devices 370. The host controller illustratively enumerates the devices that it finds and identifies them to the operating system 122. The operating system then loads the composite USB bus or generic parent driver for the device which, in turn, causes the MB class driver 358 and any other relevant child function drivers to be loaded into memory 120. When the MB class driver 358 is loaded by the operating system 122 to operate and communicate with the device 370, a notification is received by the DSLSPC 310. The DSLSPC 310 utilizes the DSS API 307 (e.g., a Microsoft Device Service Extensions API) to enumerate any (VSP) device services supported by the MBIM device 370. If any VSP device services of interest are detected as being supported by the device, the DSLSPC 310 notifies the DSCD 320 through the private API 315. That is, the DSCD 320 receives one or more messages from the DSLSPC 310 through the private API 315 when the MBIM device (with supporting device services) is detected by the DSLSPC. Furthermore, when the MBIM compliant device, e.g., a cell phone or dongle, is attached to the operating system (e.g., a Windows 8 (or above) system), the MB class driver is also loaded by the operating system to communicate with the device and a notification is received by the DSLSPC.

Upon receiving this notification, the DSCD 320 prepares for further messages (e.g., IOCTLs) from the DSLSPC 310 indicating the detection of specific VSP device services. For each different VSP device service enumerated on the device 370, the DSLSPC 310 issues a message to the DSCD 320 through the private API 315 identifying the specific VSP device service, which causes the DSCD 320 to create a child driver instance of the appropriate DSLSPD 330-350 that is then loaded by the system. When loaded, the DSLSPD instance 330-350 registers the (serial) com port device interface GUID, thus establishing an interface available for the legacy applications 302-306 to utilize for end-to-end communication. The legacy applications 302-306 utilize the Win32 API to open and configure their respective com ports for communication.

In one or more embodiments, the DSLSPD 330-350 may be configured to receive I/O Request Packets (IRPs) and IOCTLs from the legacy applications 302-306 and pass them down the driver stack to the DSCD 320. If the DSCD 320 can satisfy, e.g., process, a given request itself it does so. If it cannot immediately satisfy a given request, the DSCD 320 transfers the request to the DSLSPC 310 using the previously-established private API connection 315. The DSLSPC 310 translates IOCTL requests to appropriate MBIM VSP DSS CIDs and forwards them through the MB class driver 358 (via the DSS API 307) to the corresponding VSP device service in the device 370. The DSLSPC 310 also formats outbound data for transfer as a targeted DSS payload to the MB class driver 358 for subsequent transmission over the bus 150 in, e.g., a Network Transfer Block (NTB). Similarly, inbound data forwarded by the MB class driver 358 is extracted and sent through the private API 315 shared with the DSCD 320 through to the targeted DSLSPD driver instance 330-350.

Removal of the MBIM device 370 during computer operation is detected by the USB host controller driver, which informs the operating system 122 of the removal. The operating system 122 then signals the device function and composite drivers to release their resources, thereby unloading the drivers. While the MB class driver 358 is processing the device removal, a notification is received by the DSLSPC 310 which then sends a message to the DSCD 320, via the private API 315, for each affected device service. This causes the DSCD 320 to deregister the unique device interface GUIDs, which result in one or more departure notifications to be received by each loaded DSLSPD instance 330-350. The DSLSPD instances 330-350 respond to this notification by deregistering the com port interface GUID previously registered and begin the process of unloading. The DSCD 320 reports a change in status of its children (driver instances) and participates in their subsequent unloading, thus tearing down the system infrastructure that enabled legacy VSP applications 302-306 to achieve end-to-end communication with their corresponding VSP device services.

The foregoing description has been directed to particular embodiments of this invention. It will be apparent, however, that other variations and modifications may be made to the described embodiments, with the attainment of some or all of their advantages. Specifically, it should be noted that embodiments of the present invention may be implemented in connection with various host systems and are not limited to host systems that rely on a particular operating system. Also, the procedures, processes and/or modules described herein may be implemented in hardware, software, embodied as a computer-readable medium having program instructions, firmware, or a combination thereof.

What is claimed is:

1. A system configured to enable a user mode legacy application to achieve end-to-end communication with a wireless wide area network (WWAN) service supported by a device attached to a computer executing an operating system, the system comprising:
    a user mode protocol controller communicating with the WWAN service using a device service stream (DSS) application programing interface (API), the protocol controller configured to detect the WWAN service supported by the device, wherein the WWAN service executes in user mode of the operating system;
    a kernel mode composite driver communicating with the protocol controller via a private interface, the composite driver configured to identify the WWAN service supported by the device, wherein the private interface bridges kernel and user modes of the operating system; and
    a kernel mode protocol driver instance communicating with the user mode WWAN service via the kernel mode composite driver, the protocol driver instance configured to provide a legacy protocol stack used to enable serial communication between the legacy application and the WWAN service supported by the device, the protocol driver instance created in response to the composite driver identifying the WWAN service supported by the device.

2. The system of claim 1 wherein the operating system is configured to load the user mode protocol controller during a system boot process, the operating system further configured to register the user mode protocol controller to receive an event notification when the device is attached to the computer.

3. The system of claim 2 wherein the operating system is further configured to load the kernel mode composite driver during the system boot process, the operating system further configured to register a unique device interface identifier of the kernel mode composite driver.

4. The system of claim 3 wherein the kernel mode composite driver is configured to register the unique device interface identifier in order to bind with the user mode protocol controller and establish the private interface.

5. The system of claim 4 wherein the operating system is further configured to load a mobile broadband (MB) class driver to communicate with the user mode protocol controller and the device.

6. The system of claim 5 wherein the user mode WWAN service communicates with the device via the MB class driver.

7. The system of claim 6 wherein the operating system is further configured to load the user mode protocol driver and register a communication port device interface of the kernel mode protocol driver for use by the legacy application to achieve end-to-end communication with the WWAN service supported by the device.

8. The system of claim 7 wherein the kernel mode protocol driver is further configured to receive an input/output control code (IOCTL) from the legacy application and pass the IOCTL to the user mode protocol controller by way of the kernel mode composite driver and the private interface.

9. The system of claim 8 wherein the private interface is a private API channel that provides an exchange of the IOCTL between the user mode protocol controller and the kernel mode composite driver.

10. The system of claim 9 wherein the user mode protocol controller is further configured to translate the IOCTL to a command identifier (CID) and forward the CID to the MB class driver via the DSS API to the WWAN service supported by the device.

11. The system of claim 1 wherein the private interface is embodied as an interface that provides an exchange of one of a function pointer and a private input/output control code between the user mode protocol controller and the kernel mode composite driver.

12. The system of claim 1 wherein the user mode protocol controller is a device services legacy software protocol controller (DSLSPC).

13. The system of claim 1 wherein the kernel mode composite driver is a device services composite driver (DSCD).

14. The system of claim 1 wherein the kernel mode protocol driver is a device services legacy software protocol driver (DSLSPD).

15. The system of claim 1 wherein the device is a mobile broadband interface model (MBIM) compliant device.

16. The system of claim 1 wherein the legacy application is a legacy virtual serial port (VSP) application.

17. A method for enabling a user mode legacy application to achieve end-to-end communication with a wireless wide area network (WWAN) service supported by a device attached to a computer executing an operating system, the method comprising:
    detecting the WWAN service supported by the device at a user mode protocol controller of the computer, wherein the protocol controller communicates with the WWAN service using a device stream service (DSS) application programming interface, the WWAN service executing in user mode of the operating system;
    communicating between the user mode protocol controller and a kernel mode to composite driver of the computer over a private interface to identify the WWAN service supported by the device, wherein the private interface bridges user and kernel modes of the operating system; and
    creating a kernel mode protocol driver instance of the computer in response to the kernel mode composite driver identifying the WWAN service supported by the device, the protocol driver instance providing a legacy protocol stack to enable serial communication between the legacy application and the WWAN service supported by the device, wherein the kernel mode protocol driver communicates with the user WWAN service via the kernel mode composite driver.

18. The method of claim 17 wherein the user mode WWAN service communicates with the device via a MB class drive.

19. The method of claim 17 wherein communicating comprises:
    embodying the private interface as an interface that provides an exchange of one or more function pointers or private input/output control codes between the user mode protocol controller and the kernel mode composite driver.

20. A system configured to enable a user mode legacy application to achieve end-to-end communication with a wireless wide area network (WWAN) service supported by a mobile broadband interface model (MBIM) compliant device attached to a computer executing an operating system, the system comprising:
    a user mode device services legacy software protocol controller (DSLSPC) configured to detect the WWAN service supported by the MBIM compliant device;
    a kernel mode device services composite driver (DSCD) configured to communicate with the DSLSPC over a private interface to identify the WWAN service supported by the MBIM compliant device, the private interface embodied as an interface that provides an exchange of one of a function pointer and a private input/output control codes between the DSLSPC and the DSCD, wherein the private interface bridges user and kernel mode of the operating system; and
    a kernel mode device services legacy software protocol driver (DSLSPD) instance configured to provide a legacy protocol stack used to enable serial communication between the legacy application and the WWAN service supported by the MBIM compliant device, the DSLSPD created by the DSCD in response to the DSCD identifying the WWAN service supported by the MBIM compliant device.

* * * * *

UNITED STATES PATENT AND TRADEMARK OFFICE
CERTIFICATE OF CORRECTION

PATENT NO.        : 8,959,534 B2
APPLICATION NO.   : 13/618689
DATED             : February 17, 2015
INVENTOR(S)       : Salvatore Gregory Scaffidi, Jr. et al.

Page 1 of 1

It is certified that error appears in the above-identified patent and that said Letters Patent is hereby corrected as shown below:

In the Claims:

Claim 17, Col. 9, line 47 should read:
and a kernel mode composite driver of the computer Claim 20, Col. 10, line 37 should read:
control code between the DSLSPC and the DSCD Signed and Sealed this
Fifth Day of April, 2016

Michelle K. Lee
*Director of the United States Patent and Trademark Office*